US008725831B2

(12) United States Patent
Barbeau et al.

(10) Patent No.: US 8,725,831 B2
(45) Date of Patent: May 13, 2014

(54) ARCHITECTURE AND TWO-LAYERED PROTOCOL FOR REAL-TIME LOCATION-AWARE APPLICATIONS

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US);
Alfredo Perez, Tampa, FL (US)

(73) Assignee: University of South Florida, Tampa, FL (US)

( * ) Notice: Subject to any disclaimer, the term of this patent is extended or adjusted under 35 U.S.C. 154(b) by 241 days.

(21) Appl. No.: 13/082,094

(22) Filed: Apr. 7, 2011

(65) Prior Publication Data

US 2011/0246606 A1   Oct. 6, 2011

Related U.S. Application Data

(63) Continuation of application No. PCT/US2009/059825, filed on Oct. 7, 2009.

(60) Provisional application No. 61/103,395, filed on Oct. 7, 2008.

(51) Int. Cl.
*G06F 15/16*   (2006.01)
*H04L 29/06*   (2006.01)

(52) U.S. Cl.
CPC ..................... *H04L 29/06* (2013.01)
USPC .......... 709/217; 370/282; 455/456.1

(58) Field of Classification Search
CPC ........................................................ H04I 29/06
USPC ............. 370/229, 230, 252, 310, 315, 351;
455/3.01, 400, 403, 7, 26, 1, 73;
709/201, 204, 213, 217, 220, 223, 227,
709/230, 238, 245, 250
See application file for complete search history.

(56) References Cited

U.S. PATENT DOCUMENTS 6,831,598 B2 * 12/2004 Saint-Hilaire et al. ... 342/357.34
7,136,364 B2 * 11/2006 Saint-Hilaire et al. ........ 370/331
(Continued)

FOREIGN PATENT DOCUMENTS

WO   2004077785 A1   9/2004

OTHER PUBLICATIONS

International Search Report for PCT/US2009/059985, dated May 31, 2010.
(Continued)

*Primary Examiner* — Kibrom T Hailu
(74) *Attorney, Agent, or Firm* — Molly Sauter; Courtney Dunn; Smith & Hopen, P.A.

(57) ABSTRACT

A two-layer communication protocol that supports efficient real-time location-aware application on multiple mobile devices that must communicate with each other and/or a centralized server. The two-layer protocol includes a method of communicating data between a first mobile device and a second mobile device using a server to facilitate the communication of the data. The two-layer communication protocol also includes a method of communicating data between a first mobile device and a second mobile device using a server to facilitate the connection between the two devices. The communication of data occurs directly between the two mobile devices. Each method uses reliable, connection-oriented protocols to exchange application-level information and control signals while utilizing unreliable, connection-less protocols to communicate real-time location data. Also provided are architectures implementing these methods.

30 Claims, 6 Drawing Sheets

(56) References Cited

U.S. PATENT DOCUMENTS

| | | | |
|---|---|---|---|
| 7,328,030 B2* | 2/2008 | Laursen et al. | 455/466 |
| 2003/0206549 A1* | 11/2003 | Mody et al. | 370/390 |
| 2004/0221004 A1* | 11/2004 | Chalfin et al. | 709/203 |
| 2005/0021821 A1* | 1/2005 | Turnbull et al. | 709/232 |
| 2005/0117529 A1* | 6/2005 | Ramos-Escano et al. | 370/282 |
| 2006/0245406 A1* | 11/2006 | Shim | 370/338 |
| 2008/0220728 A1* | 9/2008 | Seo | 455/90.2 |
| 2011/0173436 A1* | 7/2011 | VanHeyningen et al. | 713/150 |

OTHER PUBLICATIONS

International Search Report for PCT/US2009/059825, dated May 17, 2010.
Skyhook Wireless, Inc, How It Works: XPS Overview, dated Jul. 31, 2008, accessed via http://web.archive.org/web/20080731065440/http://skyhookwireless.com/howitworks/, on Jun. 23, 2011.
ABI: GPS Handset Market Poised for Huge Expansion/GPS World, http://www.gpsworld.com/news/abi-gps-handset-market-poised-huge-expansion-3864, dated May 9, 2008, accessed Jun. 22, 2011.
Aldawoodi, An Approach to Designing an Unmanned Helicopter Autopilot Using Genetic Algorithms and Simulated Annealing, PhD. diss., University of South Florida, Jun. 1, 2008, pp. 1-228.
Amin et al., Mobile Century Using GPS Mobile Phones as Traffic Sensors: A Field Experiment, 15th World Congress on Intelligent Transportation Systems, Nov. 2008, New York, pp. 1-4.
Zhao, Standardization of Mobile Phone Positioning for 3G Systems, IEEE Communications Magazine, Jul. 2002, vol. 40, No. 7, pp. 108-116.
Chen et al., Lore: An Infrastructure to Support Location-Aware Services, IBM Journal of Research and Development, Sep./Nov. 2004, vol. 48, No. 5/6, pp. 601-615.
Prasithsangaree et al., Analysis of Energy Consumption of RC4 and AES Algorithms in Wireless LANs, IEEE Global Telecommunications Conference, Dec. 2003, San Francisco, CA, vol. 3, pp. 1445-1449.
Barbeau et al., Dynamic Management of Real-Time Location Data on GPS-Enabled Mobile Phones, Second International Conference on Mobile Ubiquitous Computing Systems, Services and Technologies, Valencia Spain, Sep. 2008, pp. 1-6.
Hoh et al., Virtual Trip Lines for Distributed Privacy-Preserving Traffic Monitoring, MobiSys, Breckenridge, Colorado, USA, Jun. 17-20, 2008, pp. 1-14.
Barbeau et al., A General Architecture in Support of Interactive, Multimedia, Location-Based Mobile Applications, IEEE Communications Magazine, Nov. 2006, vol. 44, No. 11, pp. 156-163.
Bellavista et al., the PoSIM Middleware for Translucent and Context-Aware Integrated Management of Heterogeneous Positioning Systems, Computer Communications, Apr. 2008, vol. 31, No. 6, pp. 1078-1090.
Kupper et al., TraX: A Device-Centric Middleware Framework for Location-Based Services, IEEE Communications Magazine, Sep. 2006, vol. 44, No. 9, pp. 114-120.
Shah et al., An Architecture for Location Tracking Using SIP, IEEE Global Telecommunications Conference, Nov. 2007, Washington, D.C., pp. 124-128.
Zundt et al., Realizing Peer-To-Peer Location-Based Services in Mobile Networks, Proceedings of the 2nd Workshop on Positioning, Navigation and Communication (WPNC'05) & 1st Utra-Wideband Expert Talk (UET'05), Mar. 2005, Hanover, Germany, pp. 175-182.
Mintz-Habib et al., A VoIP Emergency Services Architecture and Prototype, Fourteenth International Conference on Computer Communications and Networks, Oct. 2005, San Diego, CA, pp. 523-528.
Shi et al., Performance Evaluation of Line Simplification Algorithms for Vector Generalization, The Cartographic Journal, Mar. 2006, vol. 43, No. 1, pp. 27-44.
Persad-Maharaj et al., Real-Time Travel Path Prediction Using GPS-Enabled Mobile Phones, Fifteenth World Congress on Intelligent Transportation Systems, Nov. 2008, New York, NY, pp. 1-12.
Spanoudakis et al., Extensible Platform for Location Based Services Provisioning, Proceedings of the Fourth International Conference on Web Information Systems Engineering Workshops, 2004, pp. 1-8.

* cited by examiner

US 8,725,831 B2

ARCHITECTURE AND TWO-LAYERED PROTOCOL FOR REAL-TIME LOCATION-AWARE APPLICATIONS

CROSS REFERENCE TO RELATED APPLICATIONS

This application is a Continuation of currently pending International Application No. PCT/US2009/059825, filed Oct. 7, 2009, herein incorporated by reference, which claims priority to U.S. Provisional Patent Application Ser. No. 61/103,395 entitled, filed Oct. 7, 2008, which is herein incorporated by reference.

STATEMENT OF GOVERNMENT INTEREST

This invention was made with Government support under Grant No. DOT-BD-549, RPWO#33, NCTR-77711-0 awarded by the Florida Department of Transportation. The Government has certain rights in the invention.

FIELD OF INVENTION

This invention relates to wireless communication devices and, in particular, enhancing the architecture and protocol supporting real-time location-aware applications of wireless devices.

BACKGROUND

Protocols are used by computers to communicate across a network. Protocols control the connection, communication, and data transfer between two network endpoints. There are two basic types of protocols—connection-oriented protocols and connectionless protocols.

Connection-oriented protocols establish a communication session between two network endpoints and then deliver a stream of data in the same order that it was sent from one endpoint to the other. Connection-oriented protocols are usually reliable, meaning that their ability to deliver data is more reliable. This reliability usually results from the protocol providing notifications to the sender regarding whether or not the data was delivered, and the sender resending lost information. Reliable protocols typically incur more overhead than unreliable protocols, and as a result, are slower and less scalable. Examples of reliable, connection-oriented protocols include Transmission Control Protocol (TCP), Hypertext Transfer Protocol (HTTP), and Session Initiation Protocol (SIP).

Connectionless protocols deliver data between two network endpoints without first establishing a communication session between the two. One of the devices transmits data to the other without knowing if the receiving device is available and ready to receive the data. Thus, connectionless protocols are usually unreliable and, because they incur less overhead than reliable protocols, are usually faster and more scalable. Examples of unreliable, connectionless protocols include User Datagram Protocol (UDP).

Advances in telecommunications and cell phone technology allow for the creation of many new types of applications. One class of applications, referred to as location-based applications, use the knowledge of the historical or real-time positions of a mobile device to provide a service. Global Positioning System (GPS)-enabled cell phones are currently one of the more popular devices that provide location-based services (LBS) to end users.

These devices continuously become more advanced, featuring functionality that was state-of-the-art on desktop computers just a few years ago. Not only can these cell phones tell where a user is, but they can deliver on-demand text, sound, and video to the user. By combining the knowledge of the individual's physical location with these multimedia services, many different types of location-based services can be realized. Some LBS include location-based messaging for emergency alerts such as traffic accidents or weather notices, location-based marketing of products or services to consumers, and real-time navigation instructions while driving or using public transportation.

Existing location-aware applications use architectures that combine application and location data into one protocol, usually a reliable protocol such as TCP or HTTP. However, because location updates can be as frequent as once per second, significant resources (e.g. memory, communication bandwidth, CPU cycles, energy) are consumed on both the mobile device and the server when transferring this much data. Additionally, location data may be retransmitted when lost or corrupted because of the handshake and acknowledgements required by reliable protocols. This is normally not useful, because, in real-time applications, timeliness is more important than receiving all location data transmissions. Therefore, it is preferable to use an unreliable protocol such as UDP in order to provide the timely transmission of real-time location data from one mobile device in a location-aware application system to another and/or to a central server.

SUMMARY

The present invention includes an architecture and a two-layer communication protocol that provides timely location updates via an unreliable protocol, and also provides a subscription mechanism that allows a location-aware application on a mobile device to act not only on its own real-time location, but also on the real-time location of other mobile devices in the system.

The two-layer communication protocol includes a method of communicating data between a first mobile device and a second mobile device using a server to facilitate the communication of the data. On the server, the method initiates a session with the first mobile device and a session with the second mobile device using a reliable protocol. After the sessions have been established, location updates are received from the second mobile device using an unreliable protocol and then the location updates are sent to the first mobile device using an unreliable protocol. Location updates may also be received from the first mobile device. The method may have also received a subscription request from the first mobile device using a reliable protocol to prompt the sending of the location updates to the first mobile device.

On the mobile device, the method initiates a session with the server using a reliable protocol. After the session has been established, location updates of a second mobile device are received from the server using an unreliable protocol. The method may also send the mobile device's location updates to the server using an unreliable protocol. The method may also send a subscription request to the server using a reliable protocol in order to receive the location updates of the second mobile device. If a subscription request was sent to the server, an unsubscribe request may be sent using a reliable protocol.

The two-layer communication protocol further includes a method of communicating data between a first mobile device and a second mobile device using a server to facilitate the connection between the two devices. The communication of data occurs directly between the two mobile devices. On the server, the method initiates a session with the first mobile device and a session with the second mobile device using a reliable protocol. After the sessions have been established, location updates are received from the second mobile device using an unreliable protocol. In addition, a request for the second mobile device's contact information is received from the first mobile device using a reliable protocol and a response to the request is sent back to the first mobile device using a reliable protocol. Location updates may also be received from the first mobile device using an unreliable protocol.

On the first mobile device, the method initiates a session with the server using a reliable protocol. After the session has been established, the method sends a request to the server for the second mobile device's contact information using a reliable protocol. A response is then received from the server using a reliable protocol. The method then sends a subscription request to the second mobile device using a reliable protocol. Once the subscription request is accepted by the second mobile device, location updates from the second mobile device are received using an unreliable protocol. The method may also send location updates to the server using an unreliable protocol. An unsubscribe request may also be sent to the second mobile device using a reliable protocol when the second mobile device's location updates are no longer needed.

On the second mobile device, the method initiates a session with the server using a reliable protocol. After the session has been established, the method receives a subscription request from the first mobile device using a reliable protocol. If the method accepts the subscription request, the method then sends location updates to the first mobile device using an unreliable protocol. The method may send location updates to the server using an unreliable protocol. An unsubscribe request may also be received from the first mobile device using a reliable protocol when the first mobile device no longer needs the second mobile device's location updates.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
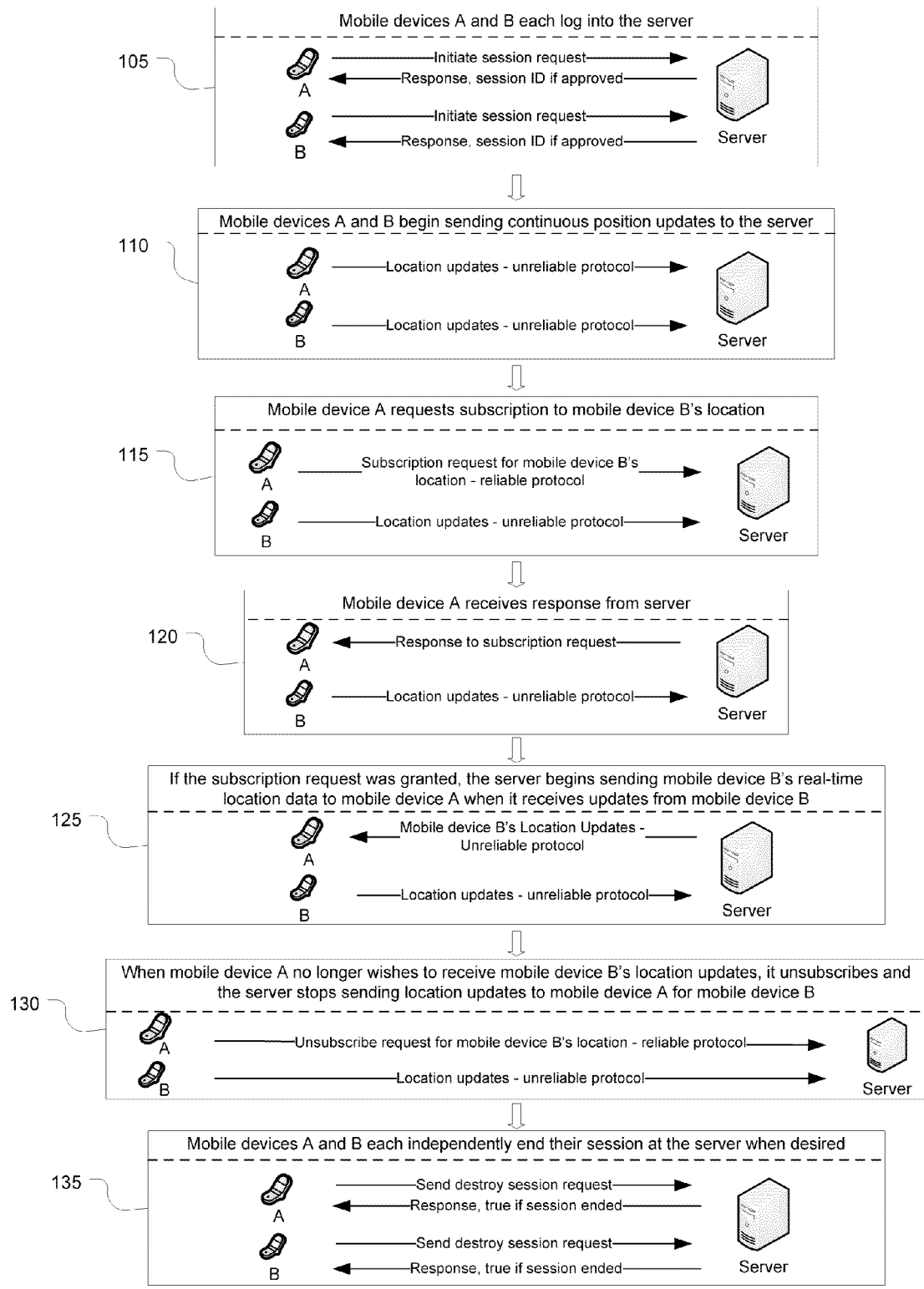
FIG. 1 is a flowchart illustrating the communication exchange between mobile devices and a server when location data for the mobile devices is obtained from the server in accordance with an embodiment of the present invention.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes an architecture and method that supports efficient real-time location-aware applications on multiple mobile devices that must communicate with each other and/or a centralized server. This architecture and method utilizes a two-layer protocol, and uses reliable, connection-oriented communication protocols (e.g. Transmission Control Protocol (TCP), Hypertext Transfer Protocol (HTTP)) to exchange application-level information and control signals, while utilizing an unreliable and connectionless protocol (e.g. User Datagram Protocol (UDP)) to communicate real-time location data.

The architecture and method allow mobile applications to respond quickly to location-based events in a system that can be triggered by the position of the device which is executing the mobile application or the position of other mobile devices in the system. The use of an unreliable protocol for location data allows better system scalability and saves device resources (e.g. battery energy, CPU cycles, memory) because the device does not have to remember a connection state for each transmission. Because location data is transported separately from application logic, it also allows for better management of network resources by allowing the processing of location data separately from application control data. The unreliable protocol is used to transport data between a mobile device (e.g. GPS-enabled mobile phone) and a server, or between two or more mobile devices (e.g. two GPS-enabled mobile phones, or a GPS-enabled mobile phone and a vehicle).

Occasional messages from the server to the mobile device (or from one mobile device to another) may be used to confirm an open connection as well as pass specific data flow-control commands to the mobile device. These messages may be sent using a reliable or unreliable protocol. For an extremely light weight design, these messages may be initiated by the server via a protocol such as UDP if direct IP-addressing of the mobile device is supported on the network. Otherwise for networks that do not support server-initiated "push" IP communication, the mobile application may occasionally initiate and tear-down a TCP connection to receive a quick response from the server.

Mobile devices are allowed to "subscribe" to location updates for other mobile devices, at which point they will receive a real-time location data stream that is transported using an unreliable protocol (e.g. UDP) from either a server, which holds a collection of the most recent location data for nearby mobile devices in the system or directly between the two mobile devices, if possible. For mobile devices that are a far distance apart, position requests using a reliable protocol (e.g. HTTP) can be occasionally executed by the mobile device against the server or other mobile devices in order to maintain a casual record of other device positions in the system. Once the two mobile devices come within a certain distance, the method can be traded for the 'subscription', upon which the mobile device will start receiving real-time location data representing the position of other mobile devices via an unreliable protocol. The position of multiple mobile devices may be monitored visually via a map on a web page. An asynchronous method (e.g. AJAX) may be used to retrieve location updates from the server in order to refresh the positions of mobile devices without requiring a refresh of the entire web page.

The architecture may be implemented using Java Micro Edition (Java ME) on GPS-enabled mobile devices, including mobile phones, in coordination with an application server (e.g. Glassfish). Many algorithms may run in the mobile phone application, including, for example, a Location-Aware State Machine (described in U.S. patent Ser. No. 12/245,072, which is incorporated herein by reference), a Critical Point method (described in U.S. patent Ser. No. 12,196,673, which is incorporated herein by reference), and an adaptive location data buffering method.

The following examples are presented from the point of view of a mobile application executing on board a mobile device, which is part of a system connected via a network that also contains other mobile devices (e.g. mobile devices, vehicles). As used herein, any reference to a mobile device shall mean the physical device itself or an application running on the device.

Example 1

Location Data for Mobile Devices Obtained from a Server

The position of mobile devices in the system are available through a central repository of data (i.e. the mobile application on a mobile device cannot contact other mobile devices directly). This example is illustrated in FIG. 1.

Mobile device A (or a mobile application running on mobile device A) logs into (or initiates a session with) a centralized server using a reliable protocol (e.g. HTTP, TCP, Session Initiation Protocol (SIP)) (operation 105). Mobile device A logs into the centralized server by sending a request to initiate a session to the server. If the server approves the session, the server returns a session ID to mobile device A. A similar process is also carried out by mobile device B.

Once mobile device A and mobile device B are logged into the server, each begins sending continuous location updates to the server (operation 110). These location updates are transmitted to the server using an unreliable protocol (e.g. UDP). Mobile device A and mobile device B will each continue to send location updates to the server until their respective sessions are terminated.

Then, based on its current application state, mobile device A can either request a subscription to another mobile device's location (operation 115) or the server may automatically decide that a mobile application should be monitoring another mobile device and subscribe the mobile application to another mobile device. If mobile device A requests a subscription to mobile device B (operation 115), the request is sent using a reliable protocol (e.g. HTTP). Once the server receives and approves or denies the subscription request, a response is sent back to mobile device A (operation 120).

Once mobile device A is subscribed to mobile device B, the server begins sending real-time location data to mobile device A via an unreliable protocol (e.g. UDP) as soon as it is able to retrieve the location data from its database (operation 125). Mobile Device A will receive the real-time location data and make application-level decisions based on the data.

Alternatively, if mobile device B is located at a far distance from mobile device A, mobile device A may retrieve occasional position updates for mobile device B from the server via a reliable protocol (e.g. HTTP) until mobile device A and mobile device B are within a certain distance of each other at which point a subscription for real-time location updates via the unreliable protocol will be activated.

When mobile device A no longer wishes to receive mobile device B's location data, it sends an 'unsubscribe' message to the server and the server stops sending the real-time location data (operation 130) for mobile device B. A mobile device may be subscribed to several mobile devices at the same time. This unsubscribe request is sent via a reliable protocol (e.g. HTTP).

Mobile device A and mobile device B each may independently log off (or end their respective session with) the server (operation 135). To log off the server, each mobile device sends a request to destroy its respective session. The server will then respond to the respective mobile device confirming that its session has successfully ended.

The mobile devices may be two mobile phones or any other feasible mobile device such as a public transit vehicle (e.g. a train or bus). For example, a mobile phone application running on a GPS-enabled mobile phone may be interested in monitoring the real-time location of a transit vehicle. After logging into the server using a reliable protocol (e.g. HTTP, SIP), the mobile application would also use a reliable protocol to subscribe to a specific transit vehicle by either explicitly requesting a subscription to a particular vehicle(s), or the server may decide which vehicle it should be subscribed to based on the preferences of the user for which transit route they wish to travel on. The phone will start receiving real-time location data via an unreliable protocol (e.g. UDP) that represents the position of the vehicle that the mobile application is subscribed to. The mobile application can then use that data to give updates to the user for how long it will be until the vehicle arrives at the mobile device's location, or use the position of the vehicle as a substitute for its own GPS position if the device cannot calculate an accurate GPS position on its own. Once the mobile application no longer requires a subscription to the vehicle, it sends an 'unsubscribe' message via a reliable protocol to the server at which point the server stops sending real-time location data via the unreliable protocol to the mobile application.

Figure 2:
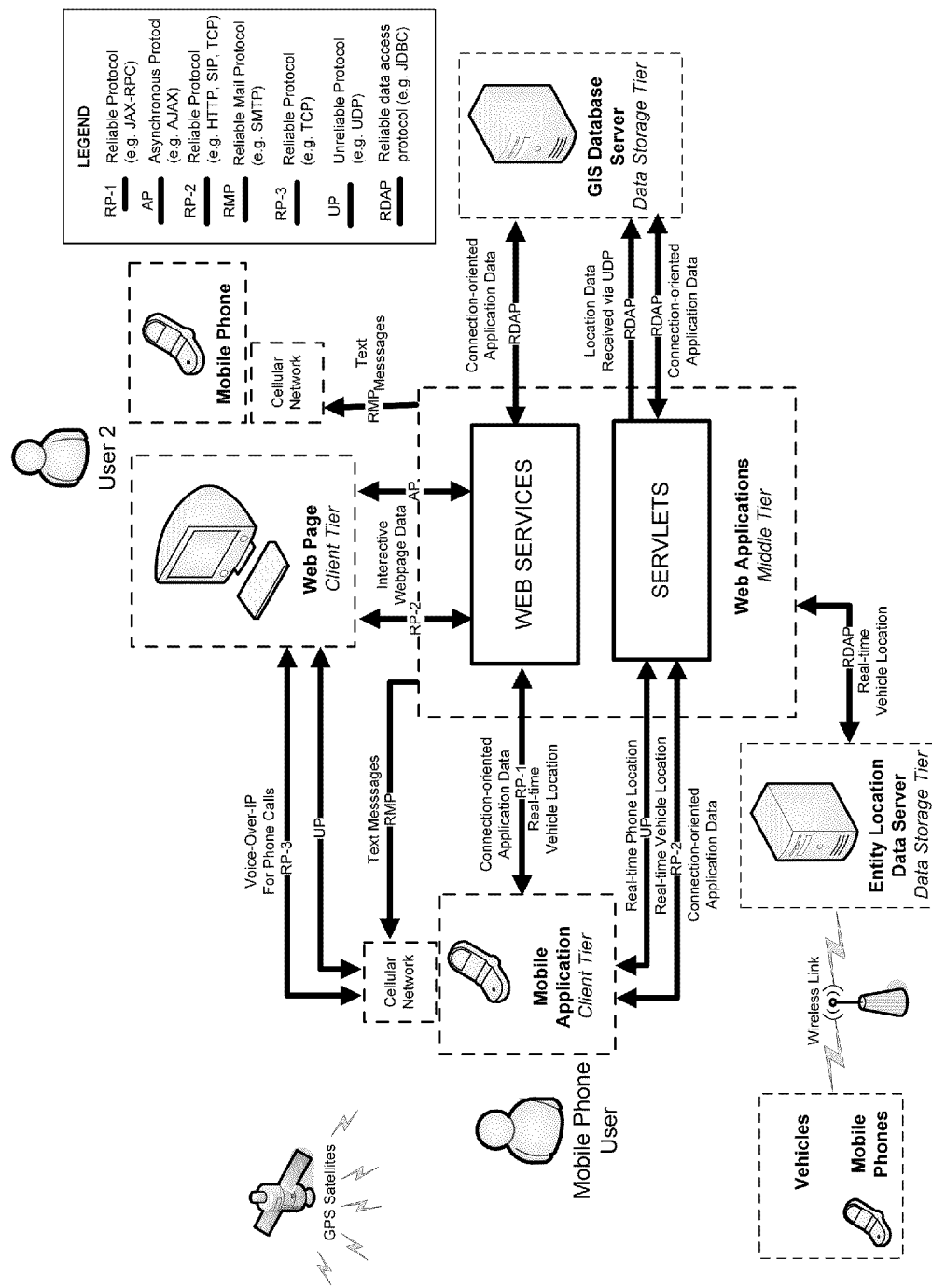
FIG. 2 is a diagram illustrating the system setup when the mobile device's location data is obtained from a server in accordance with an embodiment of the present invention.

An embodiment of a system implementing this example is shown in FIG. 2.

Example 2

Location Data for Moving Devices Obtained Directly from the Moving Device

The positions of mobile devices in the system are available by directly contacting the other mobile devices in the system. This method is preferable for time-sensitive location-aware applications that are in close vicinity of one another because the latency in time between when one device calculates an updated position and other device receives that information is reduced over a method in which the position is first sent to a server and then retrieved from a server by another device (as described in Example 1). Both devices may send occasional position updates to the server using a variety of different location update methods and usually over an unreliable protocol (e.g. UDP).

Figure 3:
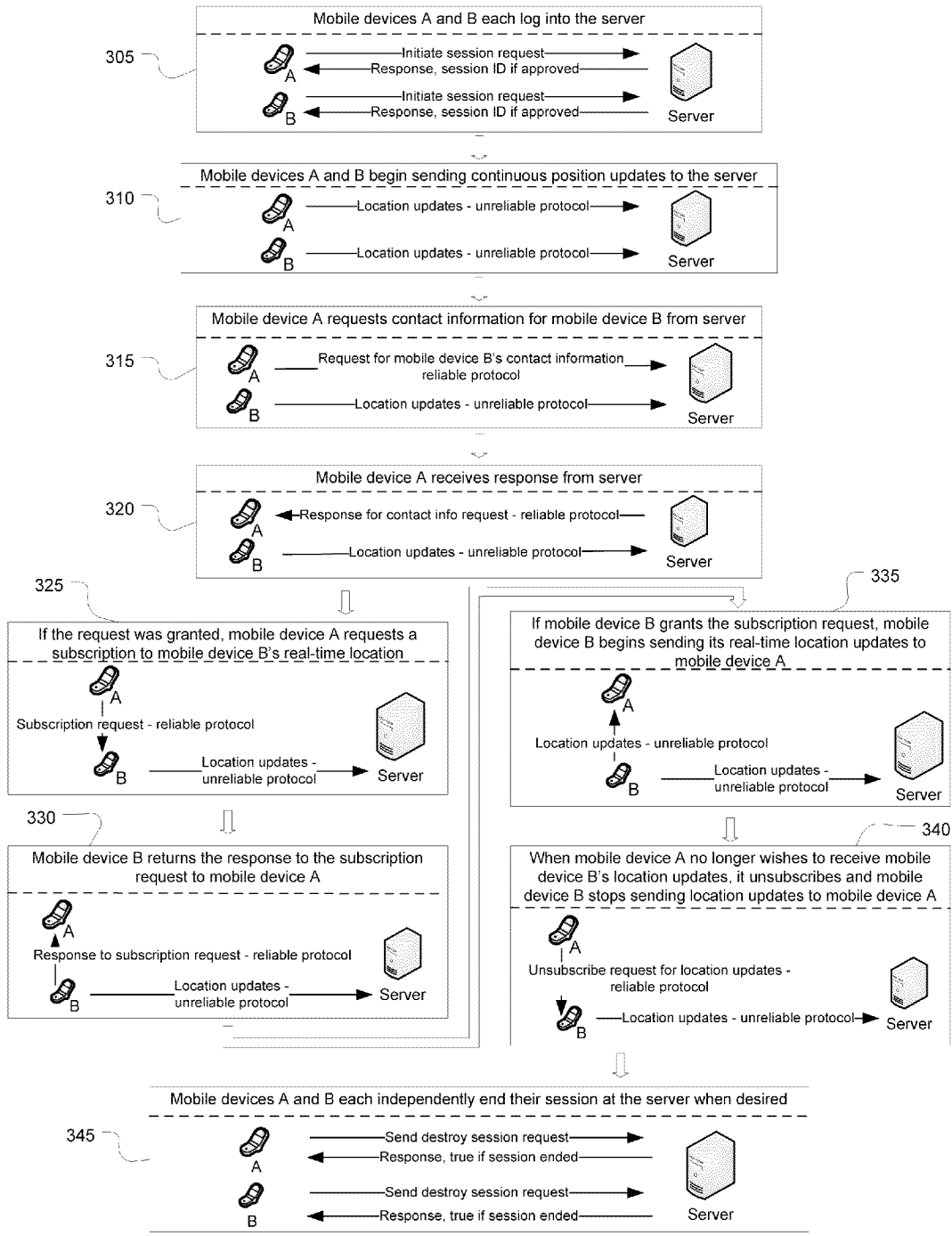
FIG. 3 is a flowchart illustrating the communication exchange between mobile devices and a server when location data for the mobile devices is obtained directly from the mobile device in accordance with an embodiment of the present invention.

FIG. 3 illustrates the process of one mobile device (mobile device A) subscribing to another mobile device (mobile device B) for location updates. Mobile device A (or a mobile application running on mobile device A) logs into (or initiates a session with) a centralized server using a reliable protocol (e.g. HTTP, SIP, TCP) (operation 305). Mobile device A logs into the centralized server by sending a request to initiate a session to the server. If the server approves the session, the server returns a session ID to mobile device A. A similar process is also carried out by mobile device B.

Once mobile device A and mobile device B are logged into the server, each begins sending continuous location updates to the server (operation 310). These location updates are transmitted to the server using an unreliable protocol (e.g. UDP). Mobile device A and mobile device B will each continue to send location updates to the server until their respective sessions are terminated.

Then, based on its current application state, mobile device A may decide to subscribe to another mobile device, here mobile device B. To do this, mobile device A begins by requesting mobile device B's contact information from the server via a reliable protocol (e.g. HTTP) (operation 315). Alternatively, the server may automatically decide that mobile device A should be monitoring mobile device B and give mobile device A instructions to subscribe to mobile device B.

Mobile device A may also retrieve occasional location data for mobile device B from the server via a reliable protocol (e.g. HTTP) until it is within a certain distance of mobile device B, at which point mobile device A may decide that it desires a subscription for real-time location updates via the unreliable protocol.

The server then sends a response to the request for contact information to mobile device A via a reliable protocol (e.g. HTTP) (operation 320). If the request was approved by the server (based on defined permissions), the response includes the contact information (e.g. current uniform resource identifier (URI), network address, port number, etc.) for mobile device B. The contact information was originally passed from mobile device B to the server in mobile device B's request to initiate a session (in operation 305).

Then, mobile device A requests a subscription to mobile device B's location and includes its own contact information (e.g. current URI, network address, port number) in the data transmission via a reliable protocol (e.g. SIP, HTTP, TCP) (operation 325). Mobile device B either grants or denies the request, and sends the decision information back to mobile device A via a reliable protocol (e.g. SIP, HTTP, TCP) (operation 330). If mobile device B grants the request, it begins sending its own real-time location data to mobile device A via an unreliable protocol (e.g. UDP) (operation 335). This subscription will continue until mobile device A unsubscribes via a reliable protocol (e.g. HTTP, SIP, TCP) (operation 340) or mobile device B decides to terminate the subscription and sends the decision to Application A via a reliable protocol. A mobile device (or its application) may be subscribed to several other mobile devices at the same time.

Mobile device A and mobile device B each may independently log off (or end their respective session with) the server (operation 345). To log off the server, each mobile device sends a request to destroy its respective session. The server will then respond to the respective mobile device confirming that its session has successfully ended.

The mobile devices may be two mobile phones or any other feasible mobile device such as a public transit vehicle (e.g. a train or bus). For example, a mobile phone application running on a GPS-enabled mobile phone may be interested in monitoring the real-time location of a transit vehicle. After logging into the server using a reliable protocol (e.g. HTTP, SIP), the mobile application would also use a reliable protocol to obtain the contact information of a specific transit vehicle by either deciding that it should begin a subscription to a particular vehicle (s), or the server may decide that the phone should start a subscription to a particular vehicle based on the preferences of the user for which transit route they wish to travel on. The server may accept or deny this request based on defined permissions. The mobile application may occasionally query the server using an reliable protocol (e.g. HTTP) to check the position of the transit vehicle and wait until the vehicle is within a certain distance threshold of the phone (e.g. 1500 meters) before requesting the subscription. The phone will then contact the transit vehicle and request a subscription to the transit vehicle's location and include its own contact information. If the transit vehicle accepts this subscription, it will start sending real-time location data via an unreliable protocol (e.g. UDP) that represents the position of the vehicle that the mobile application is subscribed to. The mobile application can then use that data to give updates to the user for how long it will be until the vehicle arrives at the mobile device's location, or use the position of the vehicle as a substitute for its own GPS position if the device cannot calculate an accurate GPS position on its own. Once the mobile application no longer requires a subscription to the vehicle, it sends an 'unsubscribe' message via a reliable protocol to the vehicle at which point the vehicle stops sending real-time location data via the unreliable protocol to the mobile application.

Figure 4:
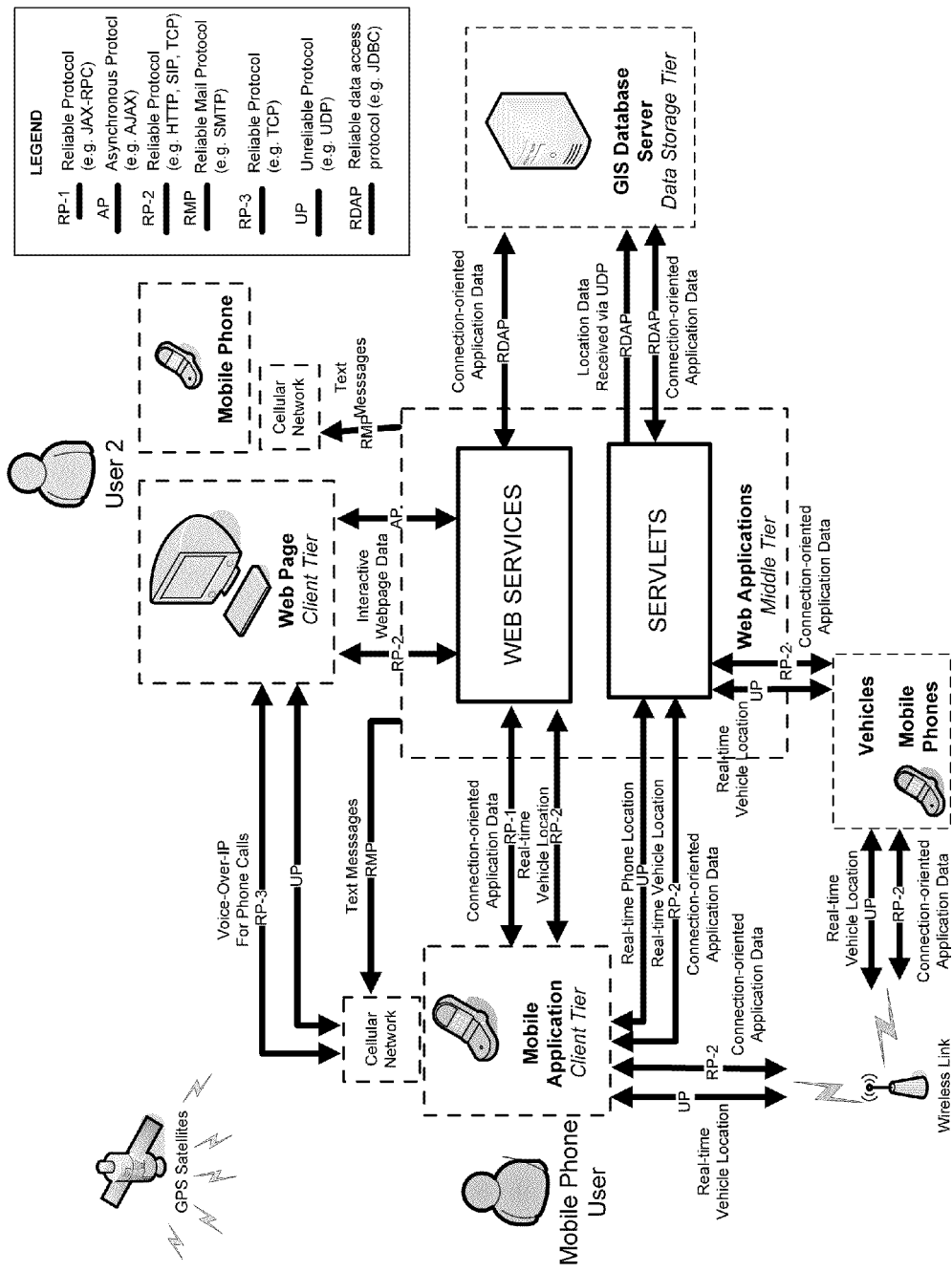
FIG. 4 is a diagram illustrating the system setup when the mobile device's location data is obtained directly from the mobile device in accordance with an embodiment of the present invention.

An embodiment of a system implementing this example is shown in FIG. 4.

Implementation Example

Location-Aware Information Systems Client
(LAISYC™)

LAISYC™ is a comprehensive location-aware framework supporting intelligent real-time mobile applications that uses an implementation of the two-layer communication protocol described above. LAISYC™ provides a general framework that can support a variety of location-aware applications with many different Requirements. These requirements can differ from time-sensitive second-by-second real-time tracking to more delay-tolerant applications focused on recording the accurate representation of travel paths. Hybrid applications that support both real-time and delay-tolerant features are also possible, because module settings can be manipulated dynamically to adjust the framework according to real-time application needs.

The following describes the LAISYC™ communication framework and each component's location in the framework (i.e. device or server-based).

Communication Framework

LAISYC™ uses a two-layer communication protocol consisting of HTTP(S) to transport application data and logic and UDP to transport location data. The flow of location data from the device to the server can also be controlled via occasional messages from the server to the phone.

HTTP(S) is used to support transfer of all non-location information required for application execution (i.e., application data) between the device and server through a device-initiated request-response model similar to remote procedure calls.

UDP, commonly used for services where timeliness is favored over reliability, is used as the efficient transport protocol for continuous location data updates from the mobile phone to a server. Location updates can happen as frequently as once per second for time-sensitive LBS, so an efficient protocol with little overhead should be used for system efficiency and scalability as well as to reduce the communication load on the limited resources of the mobile device. Occasional messages from the server to the phone are used to confirm an open connection as well as pass specific flow-control commands to the phone. For an extremely light-weight design, these messages can be initiated by the server via a protocol such as UDP if direct IP-addressing of the mobile phone is supported on the cellular network. Otherwise, for cellular networks that do not support server-initiated "push" IP communication, the mobile application can occasionally initiate and tear-down a TCP connection to receive a quick response from the server.

Device (Client)-Side Components

Figure 5:
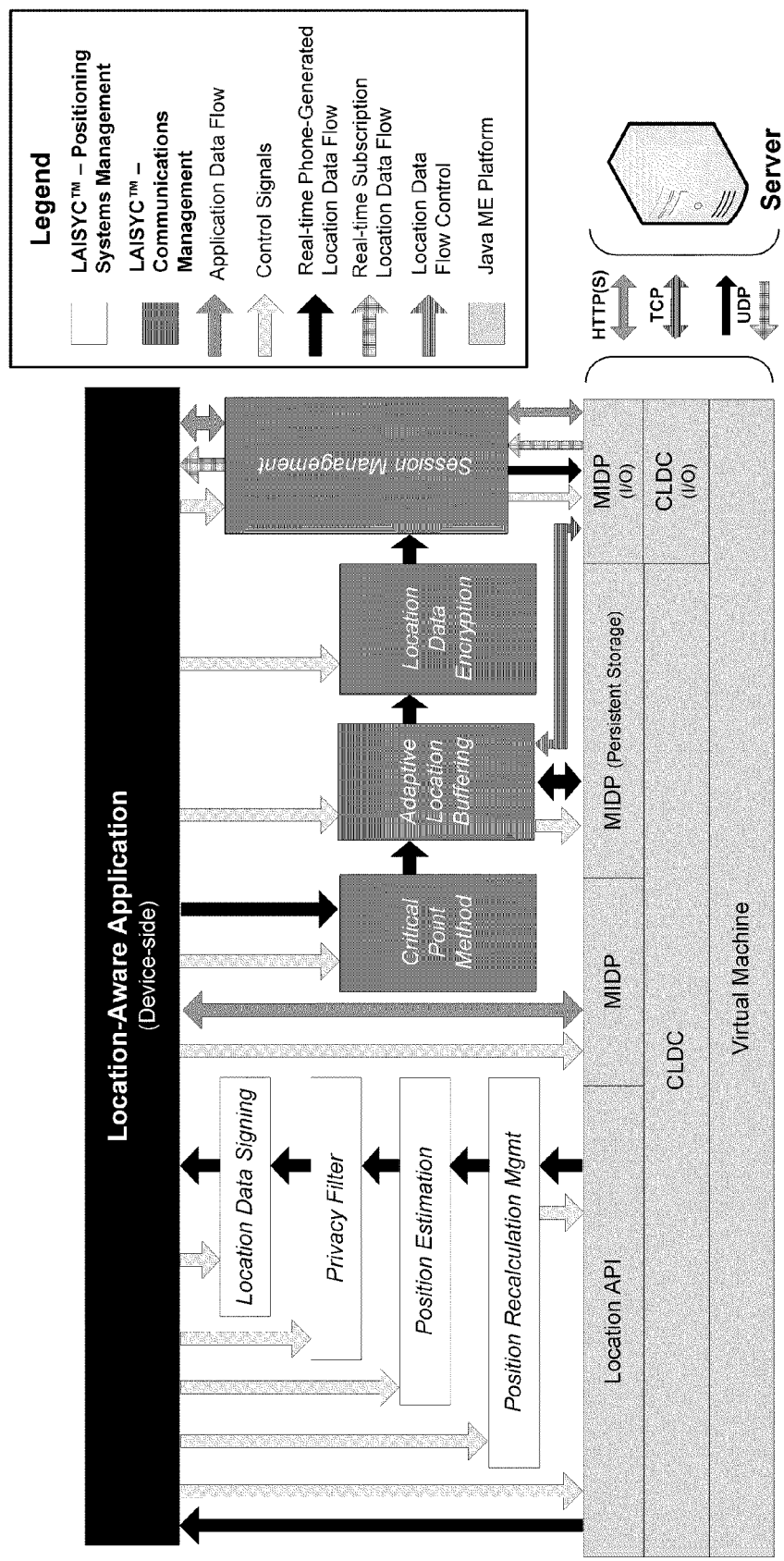
FIG. 5 is a diagram illustrating the device-side components of the LAISYC™ framework in accordance with an embodiment of the present invention.

The framework of the device-side components is shown in FIG. 5. Device-based components can be divided into two primary categories: Positioning Systems Management and Communications Management. The application can execute various types of controls, including activation and deactivation for all device-side modules, based on its real-time needs.

Location data flow from the positioning system (e.g. GPS) on the mobile device through the Location API (e.g., JSR179 or JSR293 in Java ME), and then into the bottom layer of Positioning Systems Management (i.e., Position Recalculation Management module). The location data are then propagated upwards through each module of Positioning Systems Management until they reach the application. If the application deactivates certain modules, the location data pass directly through that module without that module modifying or acting upon the data.

After the location data are propagated through Positioning Systems Management, the application then passes the location data that are a candidate for wireless transmission to the Critical Point Method in Communications Management. The data then propagate to the right until they reach the Session Management module, which activates the wireless transmission of the location data over UDP. The application also directly passes application data to the Session Management module, which activates the transmission of this information over HTTP(S).

All modules are translucent to the location-aware application, meaning that the application can also directly access underlying APIs (e.g. Location API) if necessary, to access functionality not controlled directly by the framework. The following sections outline the major client-side modules defined in LAISYC™.

A. Position Recalculation Management

The Position Recalculation Management module (described in U.S. patent application Ser. No. 12/245,072 entitled "Optimizing Performance of Location-Aware Applications Using State Machines" filed Oct. 3, 2008, which is herein incorporated by reference) intelligently adjusts the position recalculation rate of the mobile device to save battery energy when frequent position calculations are not required. Significant energy savings can be realized by reducing the interval of time between GPS fix attempts. For example, if a mobile device is stationary for a long period of time, the interval between position recalculations can gradually be increased to enter a sleep mode, and prevent repeated calculations of the same position information. The application can emerge from sleep mode, and snap back to rapid position recalculation when it determines that the device is moving. This wake-up trigger is based on the speed of the device exceeding a certain threshold, or a certain distance between the most recent GPS fixes (i.e., the user walked a certain distance from the previous GPS fix at a low speed). A state machine is used to gradually progress from fully "awake" to fully "asleep" when it is unsure whether observed motion is true movement or a result of GPS drift, thereby managing the observation of outlier data and preventing LAISYC from making large adjustments based on "noise." Embedded accelerometers, if available, can wake up the position Recalculation Management module and possibly avoid calculating an occasional GPS fix when in "sleep" mode.

The Position Recalculation Management module also has a secondary navigation mode based on the distance to a goal. This goal may be a fixed location (e.g. the next turn for real-time driving directions) or the location of a mobile device (e.g. real-time friend finder). The Position Recalculation Management module decreases the interval between position calculations as the mobile device gets closer to the goal, and increases the interval between position calculations as the mobile device moves further away from the goal.

Other intelligence to dynamically manage the selection of multiple positioning technologies, particularly when GPS is not available, can also be integrated into this module. The PoSIM middleware (Bellavista, P., Corradi, A., and Giannelli, C., "The PoSIM Middleware for Translucent and Context-Aware Integrated Management of Heterogeneous Positioning Systems," *Computer Communications*, vol. 31, no. 6, pp. 1078-1090, April 2008) is one example that can facilitate dynamic location-technology switching at runtime based on rules created by the user at compile-time.

B. Position Estimation

Device-side software can fuse data from multiple technologies (e.g. Wi-Fi, cellular signals, etc.) to estimate the current position of the device when location data from primary positioning systems are unavailable. While traditional dead-reckoning relies on accelerometers to estimate the device's movement, the Position Estimation module utilizes real-time and historical data to produce an intelligent estimate of the user's real-time position.

Many traditional data mining and artificial intelligence methods, such as neural networks, may be too computationally intense for mobile phones. However, genetic algorithms can be used to construct mathematical functions that, given a specific input, approximate the output of more complex artificial intelligence methods. The resulting function is less computationally intense and can be transferred to embedded devices for real-time processing. These functions may be able to provide an intelligent guess at the phone's current position based on past travel behavior, the time of day, and certain travel patterns.

Other types of hybrid positioning technologies, such as Skyhook Wireless, Inc.'s XPS hybrid positioning technology that is currently utilized on Apple, Inc.'s IPHONE™, can be integrated into LAISYC's modular design. Skyhook's XPS system synthesizes location data from GPS, Wi-Fi, and cellular radio broadcasts that are sensed on the device and then cross-referenced with a database of known cell tower and Wi-Fi hotspot locations. To be integrated into an application-level framework, Skyhook's technology would need to rely on the upcoming JSR307: Network Mobility and Mobile Data API to programmatically retrieve useful information (e.g. SSIDs for Wi-Fi networks) from multiple wireless interfaces on the mobile phone.

C. Privacy Filter

The current Java ME security model for the Location API has only blanket options for user approvals: Allow This Time, Always Allow, Allow Until Exit, or Never Allow. Therefore, the user must permit all location requests by the application, or the user is prompted each time the location-aware application wishes to access device location. Instead of these two extremes, it is desirable to enable the user to define conditional approvals based on preferences and device location.

The Privacy Filter allows the application to define conditional permissions for location requests, such as time limitations (e.g. requests are permitted only from 9 am to 5 pm on Monday through Friday for business employees) or sensitive location restrictions (e.g. no requests allowed while in privacy zones such as near the user's home). For extremely privacy-sensitive applications, the concept of the filter can be inverted to deny all location updates to the application except those that fall within defined "public" areas such as major interstates. The concept of "virtual trip lines" that trigger updates to the server only at certain highway locations in the Nokia and UC Berkeley Mobile Century project (Hoh, B., et al., "Virtual Trip Lines for Distributed Privacy-Preserving Traffic Monitoring," *MobiSys* '08, Breckenridge, Colo., USA, Jun. 17-20, 2008) is one example of this type of privacy filter than can be integrated into the LAISYC framework.

D. Location Data Signing

GPS data is increasingly being used by businesses and governments to support key operations, such as verification of mileage and time spent by workers on remote sites, and confirmation of the duration and location of car use for pay-as-you-drive insurance and transportation taxes. However, all of these uses of GPS data have a key weakness: GPS data is falsifiable through tampering and cannot be independently verified.

Location Data Signing utilizes asymmetric cryptography to digitally sign data related to a GPS fix. These data can include the latitude, longitude, altitude, speed, heading, GPS timestamp, system timestamp, phone number of device, and identifying information for the phone and user to prove that a particular GPS fix occurred on a particular phone with a specific user logged into the application, at a specific time. Because this information is hashed and signed by the application using a private key, the integrity of the data can be verified by utilizing the public key and a hash of the message. Therefore, it can easily be shown that a GPS fix, including the location, speed, and time, is unaltered from the data originally calculated by a specific application on-board a GPS-enabled mobile phone.

While there is likely to be some impact on device battery life due to additional CPU cycles required by the signing, lightweight cryptographic methods such as Elliptical Curve Cryptography (ECC) and Elliptic-Curve Digital Signature Algorithm (ECDSA) utilize small key lengths, which in turn translate to better performance. However, additional experimentation will be necessary to fully quantify the impact of frequent Location Data Signing on a mobile device.

E. Critical Point Method

Because GPS can generate a large amount of location data, this data must be carefully managed to avoid wasting resources such as battery energy by transferring fixes to a server that may not contain useful information (e.g. GPS fixes that are relatively close when the user is standing still, GPS fixes lying upon the same vector when traveling in a straight line). Therefore, the path of the user could be accurately represented by using only a small portion of the GPS data generated by the mobile phone.

The Critical Point Method (described in U.S. patent application Ser. No. 12/196,673 entitled "Method for Determining Critical Points in Location Data Generated by Location-Based Applications" filed Aug. 22, 2008, which is herein incorporated by reference) uses the change in direction between sequential points as well as the user's speed to filter non-critical points from a set of GPS data so that only the critical points which represent the path of the user remain. These critical points, which are a series of vertexes for connected lines, are then transferred to a server for storage and analysis. By pre-filtering GPS data before it leaves the device, the Critical Point Method is able to save battery energy, reduce data transfer costs to the user, and save network bandwidth. The load on the server is also significantly reduced because it only processes a fraction of the total GPS data generated by the mobile device. The Critical Point Method also contains a number of conditional evaluations that can be turned on or off by the application to simulate different position update methods including polling, periodic updates, and distance-based updates.

Figure 6:
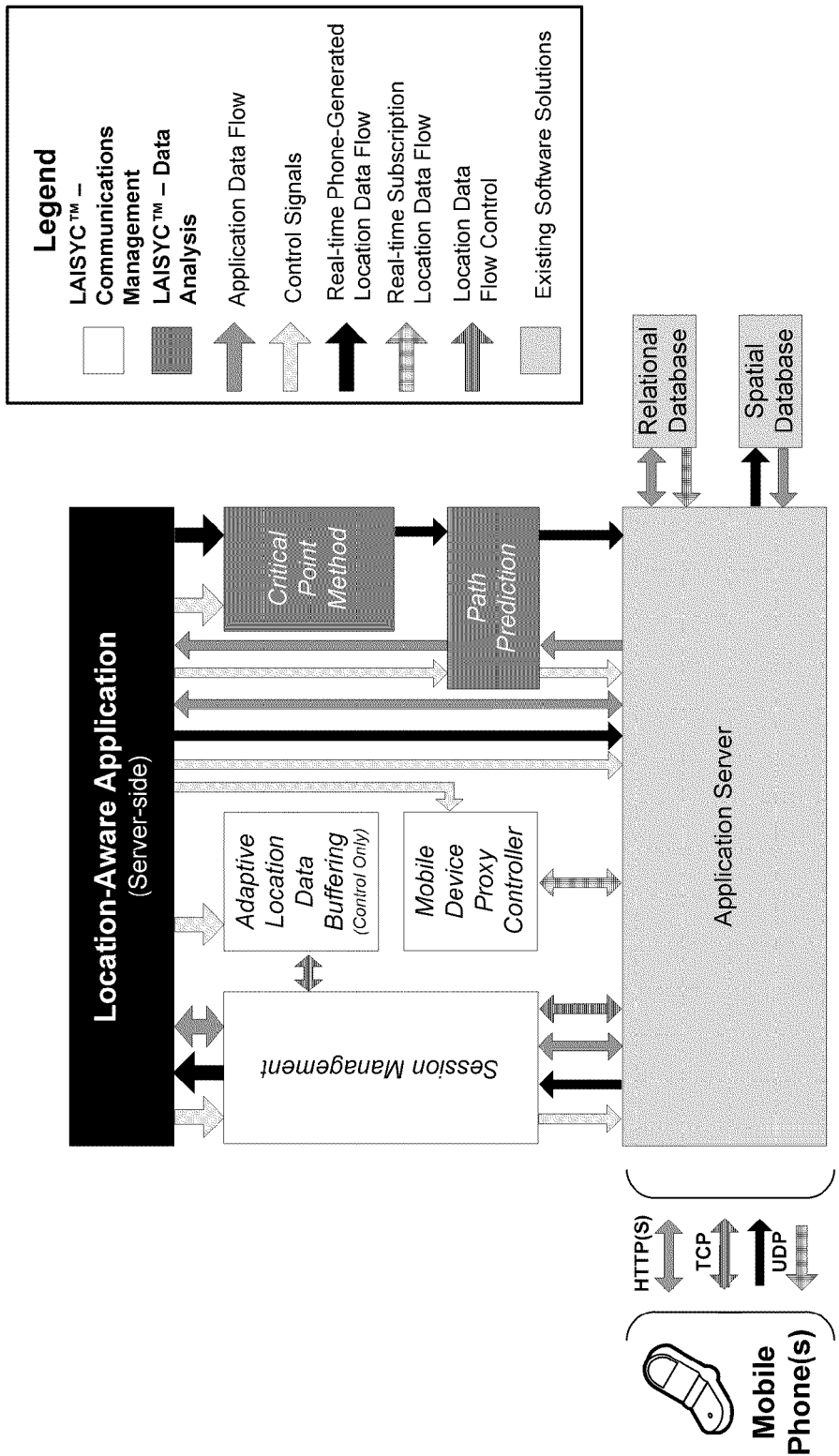
FIG. 6 is a diagram illustrating the server-side components of the LAISYC™ framework in accordance with an embodiment of the present invention.

The Critical Point Method is also replicated on the server (as shown in FIG. 6) to filter data that has not been pre-filtered onboard the device. Transferring all location data to a server may be desirable for periods when real-time, second-by-second tracking is critical to the application.

F. Adaptive Location Data Buffering

Because UDP is utilized for efficient location data transport, no end-to-end reliability exists such as that provided by TCP. In real-time tracking, the loss of occasional location data fixes is acceptable because another location update will soon follow. However, because location data is often referenced after-the-fact to provide certain metrics (e.g. distance traveled) and to reconstruct users' paths, the loss of large numbers of contiguous fixes can introduce significant problems. Extended gaps can result from lack of support for simultaneous voice and data services or lack of cellular signal.

The Adaptive Location Data Buffering module increases the probability that the majority of location data points will arrive at the server, allowing the use of location data for both historical and real-time services. Under normal conditions, UDP is used to efficiently transfer data to a server. Before each UDP transmission, device-side APIs are checked to assess the current level of cellular signal and determine if a successful UDP transmission is probable. If not, the location data is buffered to either main memory or persistent storage (e.g. MIDP RecordStore). Once it is detected that UDP transmissions are likely to succeed again, the buffered data is then sent via UDP and deleted on the device.

While the above method increases the probability that a UDP transmission will be successfully issued by the device, it does not necessarily improve the chances that a UDP packet that leaves the phone will be received by the server. Also, in several model phones we evaluated, the Java ME platform did not provide any device-side indication (e.g. software exceptions) that the UDP transmission could not be successfully issued due to lack of cellular signal. Therefore, occasionally confirming an end-to-end connection is beneficial to determine if a UDP transmission is likely to be received by the server.

Adaptive Location Data Buffering provides two different methods to occasionally confirm an open end-to-end connection with the server. If the IP address of the device is publically addressable, the server can occasionally send an "alive" message via a single UDP packet to the phone. The phone will continue to transmit UDP data to the server as long as it continues to receive the scheduled "alive" messages from the server. If an "alive" message is not received at the expected interval, (e.g. the phone is off-network, the user is on a voice call, the server is down), then the software begins buffering location data until the next "alive" message is received. When an "alive" message is again received, all buffered data is sent to the server.

For security and capacity reasons, some cellular networks do not allow mobile phones to be publically addressed via an IP address. Therefore, a server-initiated UDP packet to the phone may not be possible, or may be cost-prohibitive based on the carrier's cost model. In these situations, the Adaptive Location Data Buffering module occasionally opens a TCP connection from the phone to the server to determine if there is a successful "alive" response from the server. If there is no response (e.g. the phone is off-network, the user is on a voice call, the server is down), then the software begins buffering location data until the next successful response via TCP. Upon the next successful response, all buffered location data is sent via UDP.

It is important to note that Adaptive Location Data Buffering is a light-weight intelligent module that increases the probability that the majority of location data will arrive successfully at the server; it does not guarantee reliability for location data information. Therefore, the ratio between the number of location data transmission from the phone to the server via UDP and the number of "alive" messages received by the phone from the server should be carefully balanced based on the application's requirements for reliability.

Minimizing end-to-end checking is especially important when utilizing phone-initiated TCP transmissions, because the benefits of utilizing UDP as the primary lightweight location data transport protocol will disappear if TCP transmissions are too frequent. TCP implements several mechanisms that contain a large amount overhead, including the overhead from setting up and tearing down the connection, additional wireless communication required to transfer acknowledgement packets, the retransmission of dropped or corrupted packets, and the memory and resources occupied to maintain an open TCP connection. It was found that UDP is the preferred primary transport protocol for location data, with the "alive" messages primarily preventing large losses of contiguous location data due to atypical phone/network conditions such as the absence of a cellular signal.

"Alive" messages from the server to the phone can also be used to increase system scalability by passing location data flow control instructions back to the mobile device (e.g. Turn on Critical Point Method) if the server becomes overwhelmed with location data. The control portion of this module is implemented on the server (as shown in FIG. 6).

G. Location Data Encryption

A significant threat to the security of LBS is the interception of location data as it is being transferred over the Internet. While secure TCP connections are implemented within the Java ME platform through the use of Secure Socket Layer (SSL), the implementation of secure UDP transmissions is left to the application developer.

The Location Data Encryption module handles the encryption of location data in the payload of the UDP datagram to enable end-to-end security between the mobile device and a server. Symmetric encryption, which uses a shared key between two parties, is generally more efficient than asymmetric encryption. Therefore, asymmetric encryption using public and private keys can be used to protect the initial common key exchange using SSL and HTTPS. Symmetric encryption can then be used to encrypt the subsequent location data passed over UDP in the session.

H. Session Management—Client-Side

To maintain information at the server for each connected device, Session Management is required. The server maintains a registry of connected devices, which includes the current address (e.g. IP address) of each device. The module initiates a session for a device by calling a "createSession( )" web method and passing in a variety of information including user name, password, phone number, and other authorizing information. The server responds with a unique session identifier that will aid the server in pairing future location data received over UDP and application-specific data received over HTTP with a specific session. To signal to the server that a session is finished, the module initiates a "destroySession( )" web method.

Session Management relieves the application from direct management of sessions by implicitly controlling the creation and destruction of sessions surrounding the transfer of application and location data to the server.

LAISYC™ also supports subscriptions to real-time locations of other mobile entities (e.g. vehicles). Session Management processes incoming UDP data containing real-time subscription location information and passes this information to the application.

Server-Side Components

The framework of the server-side components is shown in FIG. 6. The server-side components can be divided into two main components: Communication Management and Location Data Analysis.

As in the client-side modules, the server-side application can assert various control signals to each component to activate or deactivate modules. The device initiates all application-logic communication to the server using the HTTP request-response model. Information flow (i.e., session requests, application-specific web services, and location data) coming into the server-side Communication Management enters through the Session Management module and propagates directly up to the application. The application can then initiate Location Data Analysis by passing the location data into the Critical Point method, which then propagates to the Path Prediction module. For subscription services, data is handled by the Mobile Device Proxy Controller module which sends location data to the device via UDP. The server-side application also interfaces with both traditional SQL relational and spatial databases.

A. Session Management—Server-Side

A session identifier, passed to the device in response to a session creation request, links multiple web service calls over HTTP with location data sent via UDP, and is used in all subsequent device-initiated communication. HTTPS is used to encrypt web service calls from the phone for secure services.

A limited amount of information for each session is kept in main memory inside the application server to enable rapid response to the device based on incoming data. While extremely time-sensitive tasks (e.g. real-time navigation) must still be handled by software on-board the mobile device, near real-time modules that access large data stores can be realized on the server-side. The disk-based database contains a record of all user, session, and location information, and serves as the persistent back-up of information contained in the application server memory. The Session Management module also manages the expiration of sessions to ensure efficient memory usage.

B. Mobile Device Proxy Controller

To support mobile device subscriptions to the real-time location of other moving entities (e.g. buses) for use in real-time cross-referencing LBS, the Mobile Device Proxy Controller proactively forwards each location update for a moving entity directly to the mobile device via UDP. This methodology avoids the latency and overhead of repeated device-initiated HTTP requests to obtain the newest location information from a server database. The mobile application issues subscribe and unsubscribe commands via HTTP.

C. Path Prediction

Intelligent location-based services should be highly relevant and precisely targeted to each user based on their real-time position and future intended path. To allow users to plan accordingly, location-based alerts (e.g. traffic accident notifications, advertising, etc.) should be distributed to travelers before they reach the area to which the alerts pertain.

Path Prediction (described in U.S. patent application Ser. No. 11/855,694 entitled "System and Method for Real-Time Travel Path Prediction and Automatic Incident Alerts" filed Sep. 14, 2007, which is herein incorporated by reference) uses spatial representations of a user's historical trips along with their current position to predict the paths they may take in the immediate future. Because human travel behavior is highly repetitive in both space and time, it is highly likely that a user's next trip will overlap with one of their historical trips.

A spatial database is used to perform a series of intersection queries between the user's real-time location/path and buffers surrounding their previously recorded paths. Each detected buffer represents a predicted path that the user may follow, and therefore additional special queries are executed to discover alerts relevant to the user (based on their personal profile and preferences) which lie along the predicted paths.

It will be seen that the advantages set forth above, and those made apparent from the foregoing description, are efficiently attained and because certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method of communicating data between a first mobile device and a second mobile device, comprising:
    sending non-location information between a server and the first mobile device using a reliable protocol to initiate a first session between the first mobile device and the server;
    sending non-location information between the server and the second mobile device using the reliable protocol to initiate a second session between the second mobile device and the server;
    receiving, by the server, location information from the first mobile device using the reliable protocol when the first mobile device is separated from the second mobile device by a distance that is greater than a predetermined distance;
    receiving, by the server, location information from the second mobile device using the reliable protocol when the first mobile device is separated from the second mobile device by a distance that is greater than the predetermined distance;
    sending, by the server, the location information of the second mobile device to the first mobile device using the reliable protocol when the first mobile device is separated from the second mobile device by a distance that is greater than the predetermined distance;
    receiving, by the server, location information from the second mobile device using an unreliable protocol that is distinct from the reliable protocol when the first mobile device is separated from the second mobile device by a distance that is less than the predetermined distance; and
    sending, by the server, the location information of the second mobile device to the first mobile device using the unreliable protocol when the first mobile device is separated from the second mobile device by a distance that is less than the predetermined distance.

2. The method of claim 1, wherein sending non-location information to initiate a first session of the first mobile device comprises:
    sending non-location information including a first session request from the first mobile device to the server using the reliable protocol; and
    sending non-location information including a first session response from the server to the first mobile device using the reliable protocol responsive to approval of the first session request by the server.

3. The method of claim 1, wherein sending non-location information to initiate a second session of the second mobile device comprises:
    sending non-location information including a second session request from the second mobile device to the server using the reliable protocol; and
    sending non-location information including a second session response from the server to the second mobile device using the reliable protocol responsive to approval of the second session request by the server.

4. The method of claim 1, further comprising:
    receiving, by the server, location information from the first mobile device using the unreliable protocol.

5. The method of claim 1, further comprising:
    receiving, by the server, non-location information including a subscription request, from the first mobile device, identifying the second mobile device using the reliable protocol; and
    sending the location information of the second mobile device to the first mobile device using the unreliable protocol, responsive to a subscription request being granted by the server identifying the second mobile device.

6. The method of claim 5, further comprising:
    receiving, by the server, non-location information including an unsubscribe request, identifying the second mobile device, from the first mobile device using the reliable protocol.

7. The method of claim 1, further comprising:
    receiving, by the server, non-location information comprising a destroy session request from the first mobile device using the reliable protocol;
    ending the session of the first mobile device responsive to receipt of the destroy session request by the server; and
    sending non-location information comprising a destroy session response to the first mobile device using the reliable protocol, responsive to the session of the first mobile device being ended.

8. The method of claim 1, further comprising:
    receiving, by the server, non-location information including a destroy session request from the second mobile device using the reliable protocol;
    ending the session of the second mobile device responsive to receipt of the destroy session request by the server; and
    sending non-location information including a destroy session response from the server to the second mobile device using the reliable protocol, responsive to the session of the second mobile device being ended.

9. A method of communicating data between a server and a first mobile device, comprising: sending non-location information between the first mobile device and the server using a reliable protocol to initiate a session between the first mobile device and the server; sending non-location information between the server and a second mobile device using the reliable protocol to initiate a second session between the second mobile device and the server; receiving, by the server, location information from the first mobile device using the reliable protocol when the first mobile device is separated from the second mobile device by a distance that is greater than a predetermined distance; receiving by the server, location information from the second mobile device using the reliable protocol when the first mobile device is separated from the second mobile device by a distance that is greater than the predetermined distance; sending, by the server, the location information of the second mobile device to the first mobile device using the reliable protocol when the first mobile device is separated from the second mobile device by a distance that is greater than the predetermined distance; receiving, by the server, location information from the second mobile device using an unreliable protocol that is distinct from the reliable protocol when the first mobile device is separated from the second mobile device by a distance that is less than the predetermined distance; and sending, by the server, the location information of the second mobile device to the first device using the unreliable protocol when the first mobile device is separated from the second mobile device by a distance that is less than the predetermined distance.

10. The method of claim 9, wherein sending non-location information between the first mobile device and the server using a reliable protocol to initiate a session with the server using a reliable protocol comprises: sending non-location information including a session request from the first mobile device to the server using the reliable protocol; and receiving, at the first mobile device, non-location information including a session request response from the server using tire reliable protocol, responsive to the sewer's approval of the session request.

11. The method of claim 9, further comprising: sending location information from the second mobile device to the server using the unreliable protocol.

12. The method of claim 9, further comprising: sending non-location information including a subscription request from the first mobile device to the server using the reliable protocol, the subscription request identifying the second mobile device; and receiving, at the first mobile device, the location information of the second mobile device from the server using an unreliable protocol, responsive to the server granting the subscription request.

13. The method of claim 12, further comprising sending non-location information including an unsubscribe request from the first mobile device to the server using the reliable protocol, the unsubscribe request identifying the second mobile device.

14. The method of claim 9, farther comprising: sending non-location information including a destroy session request from the first mobile device to the server; and receiving, at the first mobile device, non-location information including a destroy session response from the server, responsive to the server ending the session.

15. A method of communicating data between a first r mobile device and a second mobile device, comprising:
sending non-location information using a reliable protocol between a first mobile device and a server to initiate a first session between the first mobile device and the server;
sending non-location information using the reliable protocol between a second mobile device and the server to initiate a second session between the second mobile device and the server;
receiving, by the server, non-location information including a contact information request for the second mobile device's contact information from the first mobile device using the reliable protocol;
sending non-location information from the server to the first mobile device including a contact information response from the second mobile device using a reliable protocol;
transmitting location information from the second mobile device directly to the first mobile device using the reliable protocol when the first mobile device is separated from the second mobile device by a distance that is greater than the predetermined distance; and
transmitting location information from the second mobile device directly to the first mobile device using an unreliable protocol that is distinct from the reliable protocol when the first mobile device is separated from the second mobile device by a distance that is less than the predetermined distance.

16. The method of claim 15, wherein sending non-location information using the reliable protocol between a first mobile device and a server to initiate a first session of the first mobile device comprises:
receiving, by the server, non-location information including a first session request from the first mobile device using the reliable protocol; and
sending non-location information from the server, including a first session response to the first mobile device, responsive to approval of the first session request.

17. The method of claim 15, wherein sending non-location information using the reliable protocol between a second mobile device and a server to initiate a second session of the second mobile device comprises:
receiving, by the server, non-location information including a second session request from the second mobile device using the reliable protocol; and
sending non-location information from the server, including a second session response to the second mobile device, responsive to approval of the second session request.

18. The method of claim 15, further comprising:
receiving, by the server, location information from the first mobile device using the unreliable protocol.

19. The method of claim 15, further comprising:
receiving, by the server, non-location information including a destroy session request using the reliable protocol from the first mobile device;
ending the session of the first mobile device responsive to receipt of the destroy session request by the server; and
sending non-location information including a destroy session response from the server to the first mobile device using the reliable protocol, responsive to the session of the first mobile device being ended.

20. The method of claim 15, further comprising:
receiving, by the server, non-location information including a destroy session request using the reliable protocol from the second mobile device;
ending the session of the second mobile device responsive to receipt of the destroy session request by the server; and
sending non-location information including a destroy session response from the server to the second mobile device using the reliable protocol, responsive to the session of the second mobile device being ended.

21. A method of communicating data between a first mobile device and a second mobile device, comprising:
sending non-location information, using a reliable protocol, between a first mobile device and a server to initiate a session between the first mobile device and the server;

sending, from the first mobile device, non-location information including a contact information request for the second mobile device's contact information to the server using the reliable protocol;

receiving, by the first mobile device, non-location information, including a contact information response, from the server using the reliable protocol;

sending, by the first mobile device, non-location information, including a subscription request for the second mobile device, to the server using the reliable protocol;

receiving, by the first mobile device, location information from the second mobile device using the reliable protocol, responsive to the second mobile device granting the subscription request and when the first mobile device is separated from the second mobile device by a distance that is greater than the predetermined distance; and receiving, by the first mobile device, location information from the second mobile device using an unreliable protocol, that is distinct from the reliable protocol, responsive to the second mobile device granting the subscription request and when the first mobile device is separated from the second mobile device by a distance that is less than the predetermined distance.

22. The method of claim 21, wherein sending non-location information using the reliable protocol between a first mobile device and a server to initiate a session between the first mobile device and the server comprises:

sending non-location information including a session request from the first mobile device to the server using a reliable protocol; and receiving, by the first mobile device, non-location information including a session request response from the server, responsive to the server's approval of the session request.

23. The method of claim 21, further comprising:
sending location information from the second mobile device to the server using an unreliable protocol.

24. The method of claim 21, further comprising:
sending, by the first mobile device, non-location information including an unsubscribe request to the second mobile device using a reliable protocol.

25. The method of claim 21, further comprising:
sending, by the first mobile device, non-location information including a destroy session request to the server using the reliable protocol; and receiving, by the first mobile device, non-location information including a destroy session response from the server using the reliable protocol, responsive to the server ending the session.

26. A method of communicating data between a first mobile device and a second mobile device, comprising:

sending non-location information using a reliable protocol between a first mobile device and a server to initiate a session between the first mobile device and the server;

receiving, by the server, non-location information including a subscription request identifying the second mobile device from the first mobile device using the reliable protocol;

sending, by the server, location information of the second mobile device to the first mobile device using the reliable protocol, responsive to acceptance of the subscription request and when the first mobile device is separated from the second mobile device by a distance that is greater than the predetermined distance; and sending, by the server, location information of the second mobile device to the first mobile device using an unreliable protocol, that is distinct from the reliable protocol, responsive to acceptance of the subscription request and when the first mobile device is separated from the second mobile device by a distance that is less than the predetermined distance.

27. The method of claim 26, wherein sending non-location information using a reliable protocol between a first mobile device and a server to initiate a session with the server comprises:

sending, by the first mobile, non-location information including a session request to the server using a reliable protocol; and receiving, by the first mobile device, non-location information including a session request response from the server, responsive to the server's approval of the session request.

28. The method of claim 26, further comprising:
sending location information from the first mobile device to the server using an unreliable protocol.

29. The method of claim 26, further comprising:
receiving, by the server, non-location information including an unsubscribe request from the first mobile device using a reliable protocol; and discontinuing sending location information to the first mobile device.

30. The method of claim 26, further comprising:
sending, by the first mobile device, non-location information including a destroy session request to the server using a reliable protocol; and receiving, by the first mobile device, non-location information including a destroy session response from the server, responsive to the server ending the session.

* * * * *